A. ZECKENDORF.
PROCESS OF REGAINING ALCOHOL FROM AIR PASSED THROUGH FERMENTING VATS OR THE LIKE.
APPLICATION FILED OCT. 10, 1911.
1,051,051.
Patented Jan. 21, 1913.
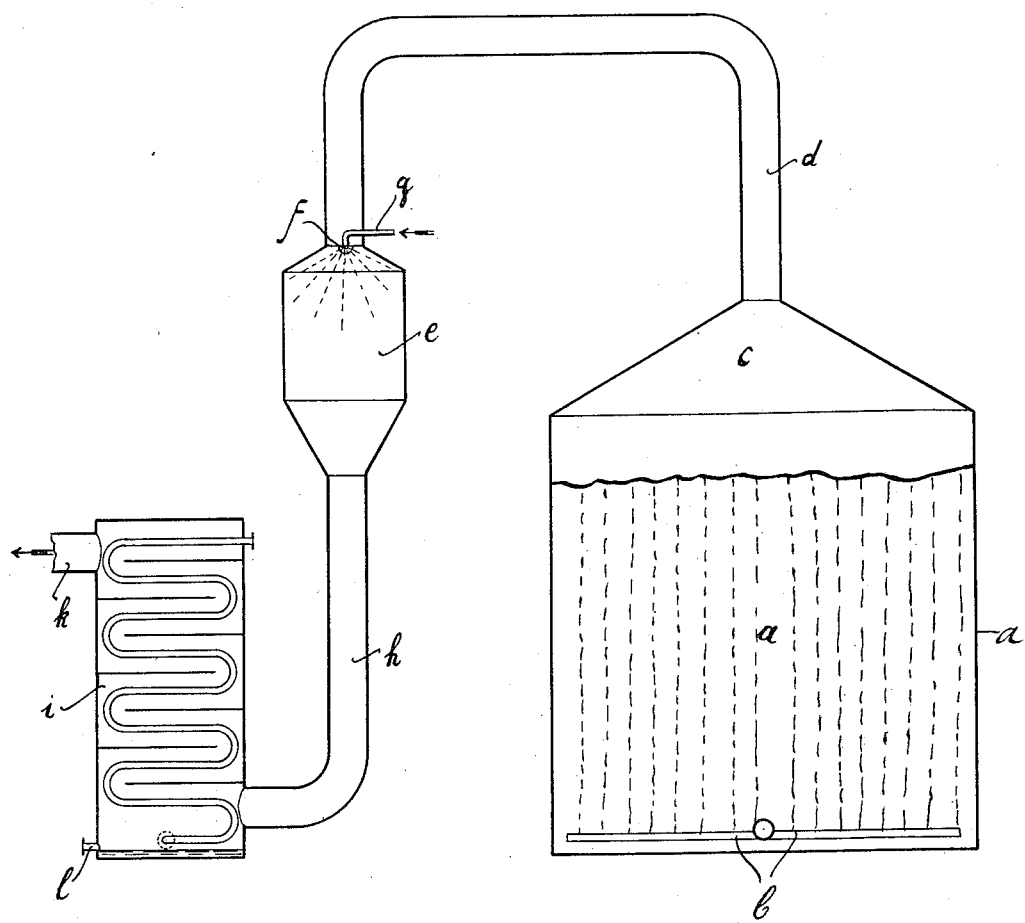

UNITED STATES PATENT OFFICE.

ALOIS ZECKENDORF, OF CINCINNATI, OHIO.

PROCESS OF REGAINING ALCOHOL FROM AIR PASSED THROUGH FERMENTING-VATS OR THE LIKE.

1,051,051. Specification of Letters Patent. Patented Jan. 21, 1913.

Application filed October 10, 1911. Serial No. 653,840.

*To all whom it may concern:*

Be it known that I, ALOIS ZECKENDORF, Ph. D., a citizen of the United States of America, residing in Cincinnati, county of Hamilton, State of Ohio, have invented a certain new and useful Process of Regaining Alcohol from Air Passed Through Fermenting-Vats or the Like, of which the following is a specification.

A process already exists according to which air used to aerate fermenting mash is caused to pass through an apparatus, in which the alcohol vapors contained therein are separated from said air and thus regained. By such a process it is possible to regain at least a part of the alcohol when the air is well saturated with such vapors. When however the alcoholic vapors are much diluted by air it becomes very difficut to separate them, so that in the more recent fermenting processes, in which a large quantity of air is caused to pass through the fermenting mash it has heretofore not been possible to economically separate the alcohol absorbed. Consequently large quantities of alcohol are lost and it has become necessary to search for means to enable the alcoholic vapors to be regained from a comparatively large quantity of air. This result is obtained according to the present invention.

The invention consists in adding to the mixture of alcohol and air a vapor such as steam which will absorb the alcohol. The steam or other vapor is quickly taken up by the mixture of alcohol and air, comes into intimate contact with the alcohol and has therefore every opportunity to absorb the same. Because a liquid, such as water, can be much more easily removed from air than alcohol, the absorbed alcohol—with the exception of but small traces—can now be separated from the air by simply condensing the vapor. The alcohol is therefore nearly entirely regained.

A further great advantage of this process is that the alcohol is not excessively diluted by water, so that the expense of separating the alcohol from the water is not prohibitive.

As the steam in this process has only to absorb the alcohol it should be as moist as possible, but its temperature is of no moment.

The accompanying drawing represents a sectional elevation of one form of apparatus employed for carrying out my improved process of regaining alcohol from air passed through fermenting vats.

*a* is the fermenting vat in which compressed air is introduced through pipes *b* which are arranged near the bottom of the vat. The air passes through the body of the mash in upward direction. The vat *a* is closed by a hood *c*, so that the air which is mixed with the alcoholic vapors cannot escape into the atmosphere, but has to pass through a pipe *d* to the mixing device *e*. The mixing device *e* is formed by an enlargement of the tube *d* and provided with a nozzle *f* at the end of a spray-pipe *g* so as to mingle the absorption-medium evenly with the compressed air. The air carrying the alcoholic vapors is conducted through the pipe *h*, after mingling with the absorption-medium, to a cooler *i* in which the absorption-medium with the alcohol which has been absorbed by it is cooled and gradually separated from the air and converted into liquid form. The air escapes through the tube *k*, where it is sucked off by a pump or ventilator. The liquefied alcoholic absorption-medium is conducted off through the pipe *l*.

What I claim and desire to secure by Letters Patent of the United States is:—

1. The described process for regaining alcohol from air passed through fermenting mash and the like, which consists in mixing the air and the alcoholic vapors carried along by the same with a vapor which absorbs alcohol, and then condensing said vapor.

2. The described process for regaining alcohol from air passed through fermenting mash and the like, which consists in mixing steam with the air and the alcoholic vapors carried along by the same, and then condensing said steam.

3. The described process for regaining alcohol from air passed through fermenting mash and the like, which consists in mixing the air and the alcohol vapors carried along by the same with a vapor which absorbs alcohol, condensing said vapor, and separating the alcohol from the condensed vapor.

In testimony, that I claim the foregoing as my invention, I have signed my name in presence of two subscribing witnesses.

ALOIS ZECKENDORF.

Witnesses:
BEN. HUMMEL,
RUDOLPH FRICKE.

Copies of this patent may be obtained for five cents each, by addressing the "Commissioner of Patents, Washington, D. C."